Aug. 19, 1958 C. R. KEYS 2,848,123
CABLE REEL LIFTING, LOADING AND TRANSPORTING APPARATUS
Filed Oct. 18, 1955 8 Sheets-Sheet 1

INVENTOR
Conrad R. Keys
BY
ATTORNEYS

Aug. 19, 1958 C. R. KEYS 2,848,123
CABLE REEL LIFTING, LOADING AND TRANSPORTING APPARATUS
Filed Oct. 18, 1955 8 Sheets-Sheet 2

INVENTOR
Conrad R. Keys
BY *Lancaster, Allwine & Rommel*
ATTORNEYS

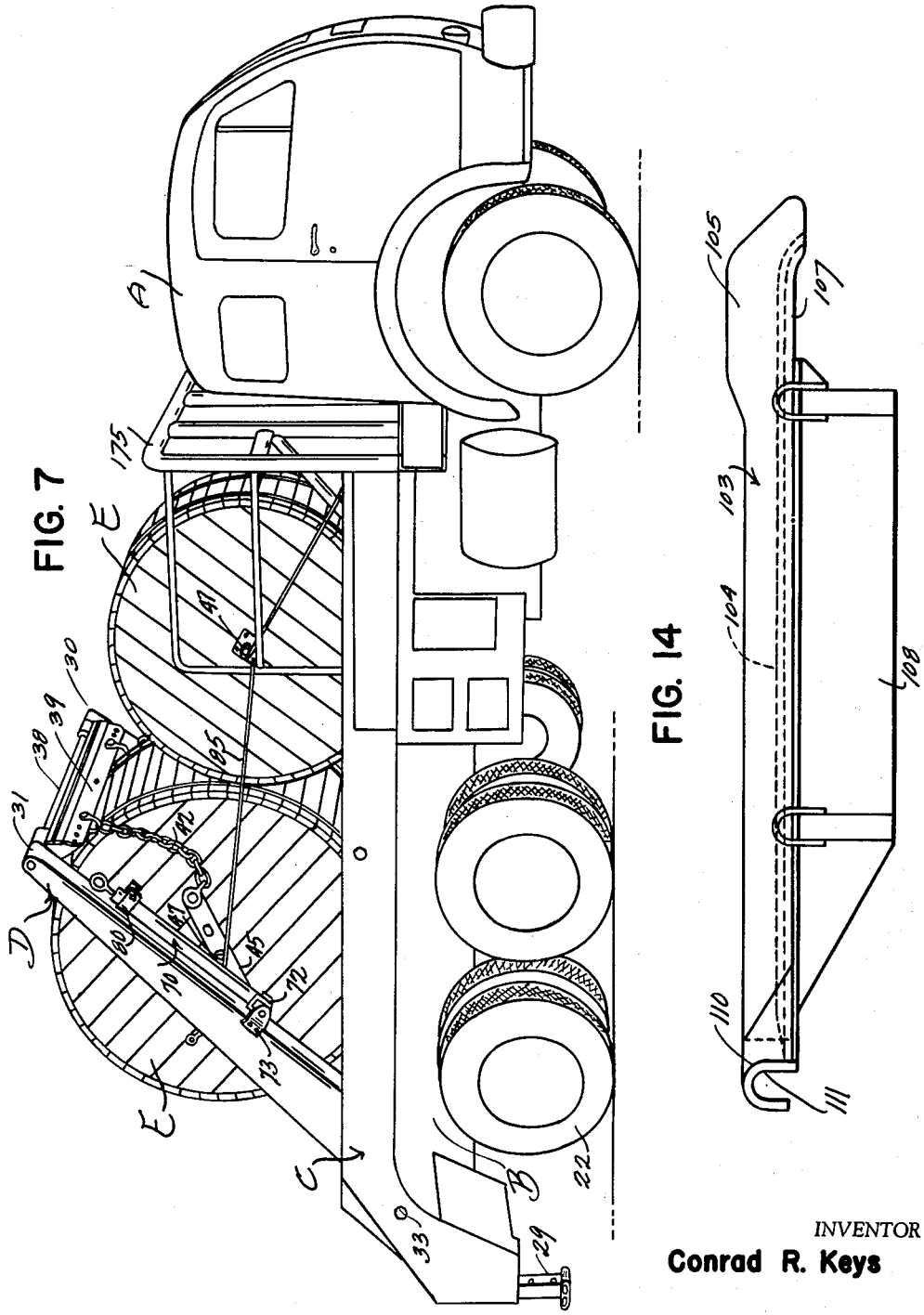

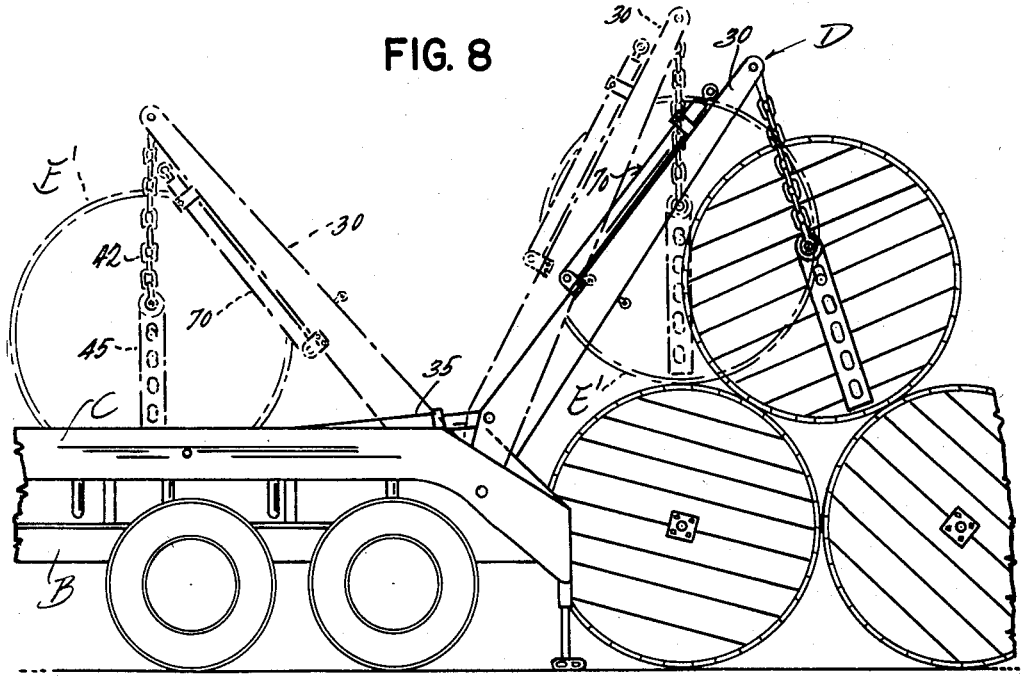
FIG. 8
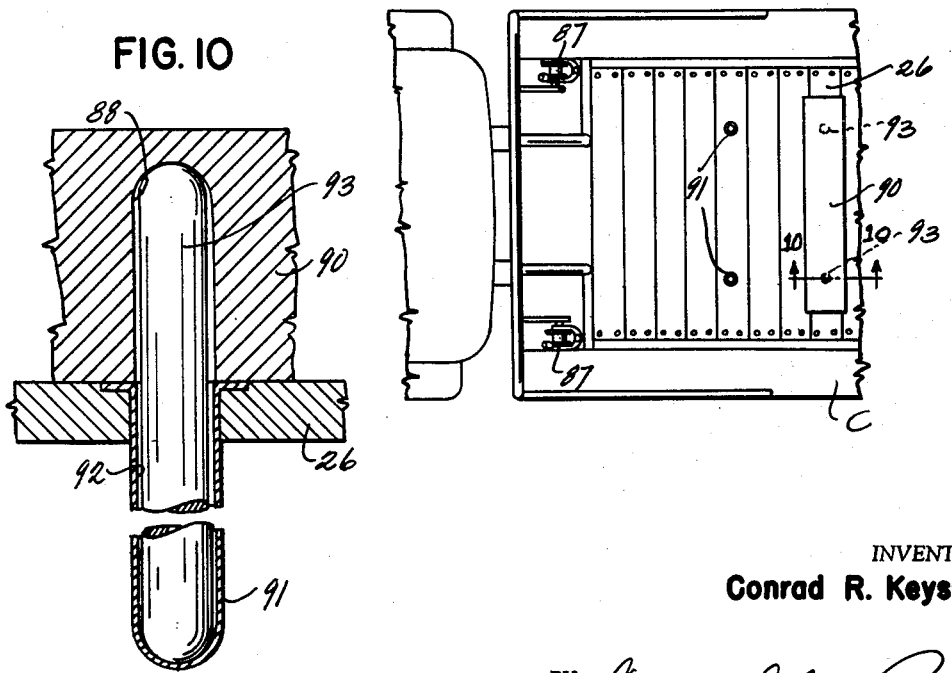
FIG. 9
FIG. 10
INVENTOR
Conrad R. Keys

Aug. 19, 1958  C. R. KEYS  2,848,123
CABLE REEL LIFTING, LOADING AND TRANSPORTING APPARATUS
Filed Oct. 18, 1955  8 Sheets-Sheet 6

INVENTOR
Conrad R. Keys
BY
ATTORNEYS

Aug. 19, 1958   C. R. KEYS   2,848,123
CABLE REEL LIFTING, LOADING AND TRANSPORTING APPARATUS
Filed Oct. 18, 1955   8 Sheets-Sheet 7
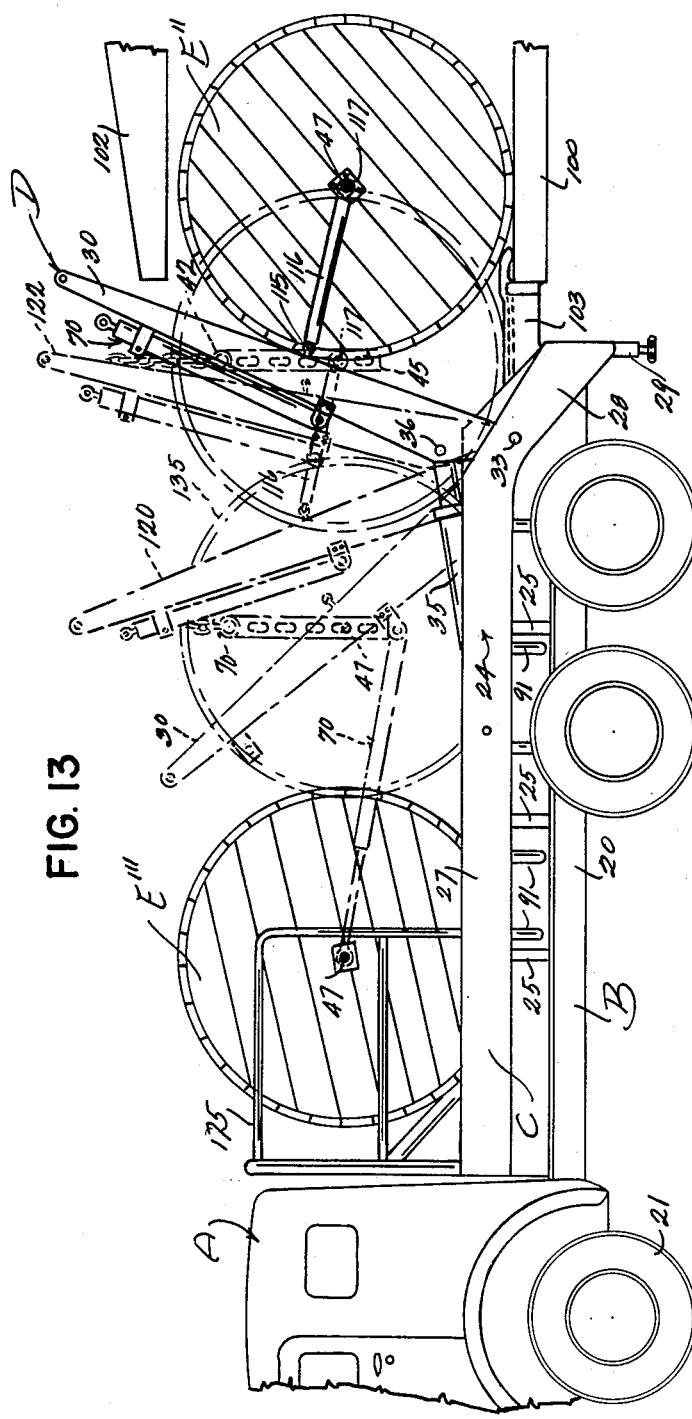
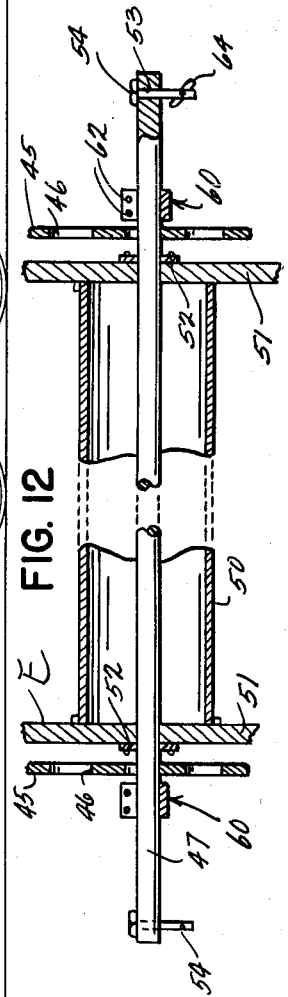
INVENTOR
Conrad R. Keys Aug. 19, 1958 C. R. KEYS 2,848,123
CABLE REEL LIFTING, LOADING AND TRANSPORTING APPARATUS
Filed Oct. 18, 1955 8 Sheets-Sheet 8
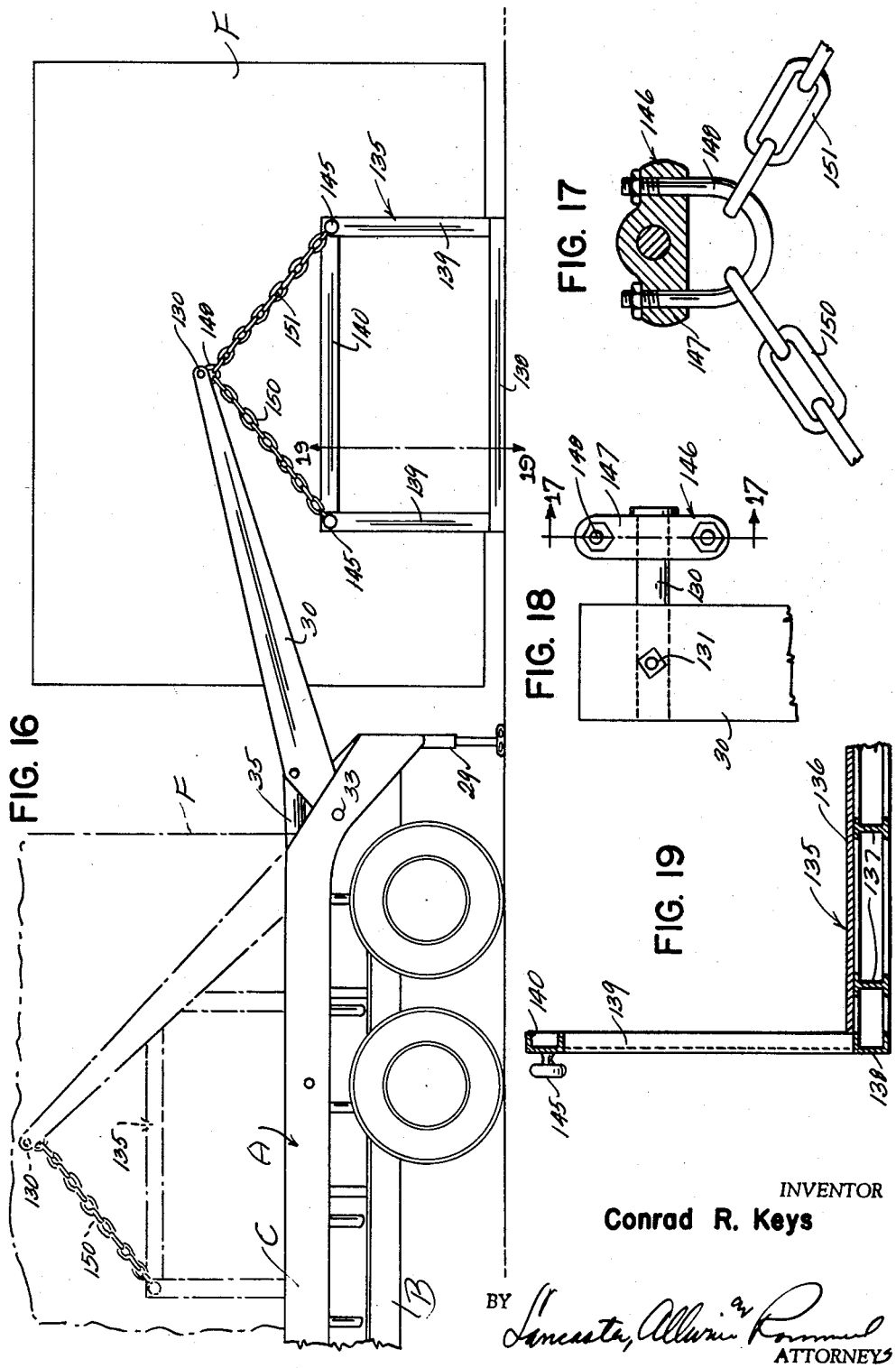
INVENTOR
Conrad R. Keys
BY
ATTORNEYS

United States Patent Office 2,848,123
Patented Aug. 19, 1958

2,848,123

CABLE REEL LIFTING, LOADING AND TRANSPORTING APPARATUS

Conrad R. Keys, Newark, N. J.

Application October 18, 1955, Serial No. 541,184

18 Claims. (Cl. 214—77)

This invention relates to improvements in hoisting and transporting equipment for the efficient, expeditious and safe handling of such heavy and bulky objects as electric and telephone cable reels and other apparatus such as power transmission appliances.

Handling huge cable reels presently consists of rolling them by means of fulcrum bars and winch controlled rope or cables. It is an expensive time and labor consuming operation and dangerous to the individuals engaged in the loading and unloading of huge cable reels, sometimes weighing many tons. Present methods of handling such reels from the time that they are received on common carriers and transported to the area where the cables are to be unwound are expensive and inefficient. It is therefore a primary object of the present invention to provide a vehicle having hoist equipment for facile loading, transporting and unloading of reels, power substations, etc., with safety and economy, and without excessive manual exertion upon the part of operators.

It is a further object of this invention to provide hoist and transportation means for handling of heavy and bulky electrical or other equipment. With the rapid and extensive development of suburban communities, power companies find it difficult to rapidly rearrange and equip such areas to meet power demands. The present invention provides for efficient transportation of such power equipment, such as transformers, lightning arresters, oil switches, sub stations, etc.; including improved hoisting means and a pallet to facilitate loading and unloading of such equipment with dispatch, ease and economy.

It is a further object of this invention to provide improved means for hoisting and supporting a cable reel in suspended stabilized position, at a desired locus, from which the cable can be uncoiled with safety and with ease and economy.

It is a further object of this invention to provide improved means for the loading and unloading of a plurality of huge cable reels from box cars, other carriers, or storage spaces with facility and economy.

It is a further object of this invention to provide loading, unloading, transporting and hoisting equipment for the handling of huge and bulky objects such as cable reels, using a minimum number of individuals.

A further object of this invention is the provision of improved apparatus for lifting, loading, transporting and lowering heavy bulky articles such as cable reels. It is almost impossible to gauge to what degree a transporting vehicle is or is not level in the lateral and horizontal planes, by visual observation. In the present invention means has been provided to keep huge cable reels in restraint at all times and for holding the cable reels parallel with the sides of the transporting truck or vehicle and upon the bed of the vehicle regardless of whether the vehicle bed is exactly level.

A further object of this invention is the provision of improved transporting and hoisting equipment which is capable of picking up and placing huge cable reels from and upon storage piles where the reels are piled more than one deep, for the purpose of conserving yard storage space.

In the drawings, wherein for the purpose of illustration is shown apparatus for lifting, loading, transporting and lowering heavy and bulky objects:

Figure 7 is a perspective view of the apparatus, including the vehicle, showing two huge reels secured upon the truck for transportation, the lift arms of the hoisting mechanism being forwardly positioned for road clearance.

Figure 8 is a fragmentary side elevation of the rear end of the transportation vehicle, showing the hoisting mechanism in position to handle reels which have been stacked one upon the other; the view showing in dot and dash lines how the upper reels are manipulated for lifting them onto the vehicle or vice versa.

Figure 9 is a fragmentary plan view of the floor or deck of the truck, showing more particularly, a bolster for stabilizing the reel after it has been properly positioned upon the truck; the view also showing hand winches for manipulating the securing cables, which are shown in Figure 7.

Figure 10 is an enlarged fragmentary cross sectional view, taken substantially on the line 10—10 of Figure 9, through a bolster, showing more particularly the manner in which the bolster is secured against shifting upon the deck of the vehicle.

Figure 12 is a fragmentary cross sectional view taken through the central portion of a cable reel, showing a spindle associated therewith, and the manner of securing key plates and safety devices upon the spindle.

Figure 13 is a fragmentary view of the truck and hoist mechanism showing the manner in which a plurality of reels may be unloaded from a platform, box car or other elevated surface, and placed with ease and security upon the deck of the truck.

Figure 14 is a side view of one form of bridge piece used in performing the operations shown in Figure 13 and adapted to bridge the space between the elevated platform or floor and the deck of the truck.

Figure 16 is a fragmentary side elevation showing the means for facile handling of high and bulky objects, such as power sub stations, for the lifting of the same onto or off of a truck deck.

Figure 17 is a fragmentary view, partly in section, showing a chain saddle, which is part of the hoisting equipment shown in Figure 16, the view being taken substantially on the line 17—17 of Figure 18.

Figure 18 is a fragmentary plan view of a chain saddle and stub shaft supported upon one of the hoist arms of the equipment for performing the operations shown in Figure 16.

Figure 19 is a fragmentary view, partly in cross section of the pallet and frame structure used in performing the operations shown in Figure 16, the view being taken substantially on the line 19—19 of Figure 16.

Figure 1:
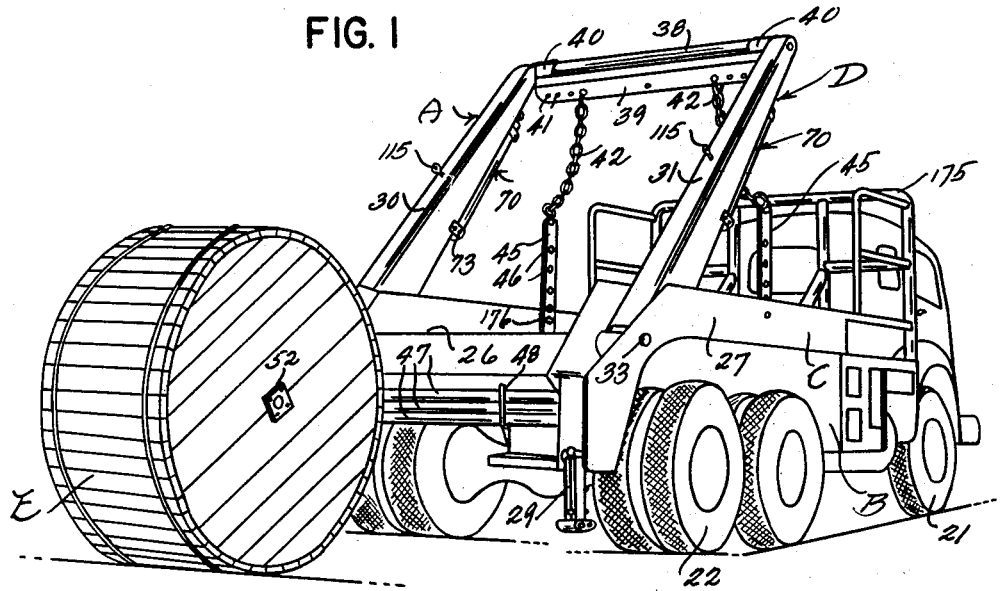
Figure 1 is a perspective view showing the improved vehicle and hoisting equipment in position to pick up a cable reel resting upon substantially the same level as that upon which the vehicle rests.

In the drawings, wherein similar reference characters designate corresponding parts throughout the several views the letter A may generally designate the apparatus for lifting, loading, and transporting and lowering heavy bulky articles. It includes a chassis B, sub frame C, and means D comprising the rest of the hydraulically operated hoisting lowering and handling equipment.

The vehicle chassis B consists of the usual chassis frame 20, having front running gear 21 and rear running gear 22 (see Figure 13).

The sub frame C comprises a frame structure 24 mounted upon cross beams 25 carried by the chassis frame 20. The frame 24 includes a deck 26 shown in Figures 1 and 2. The frame 24 includes sides 27 which slope diagonally at their rear ends 28 and there support free swinging jack legs 29 intended to contact the ground during lifting and lowering actions (see Figure 2).

Figure 2:
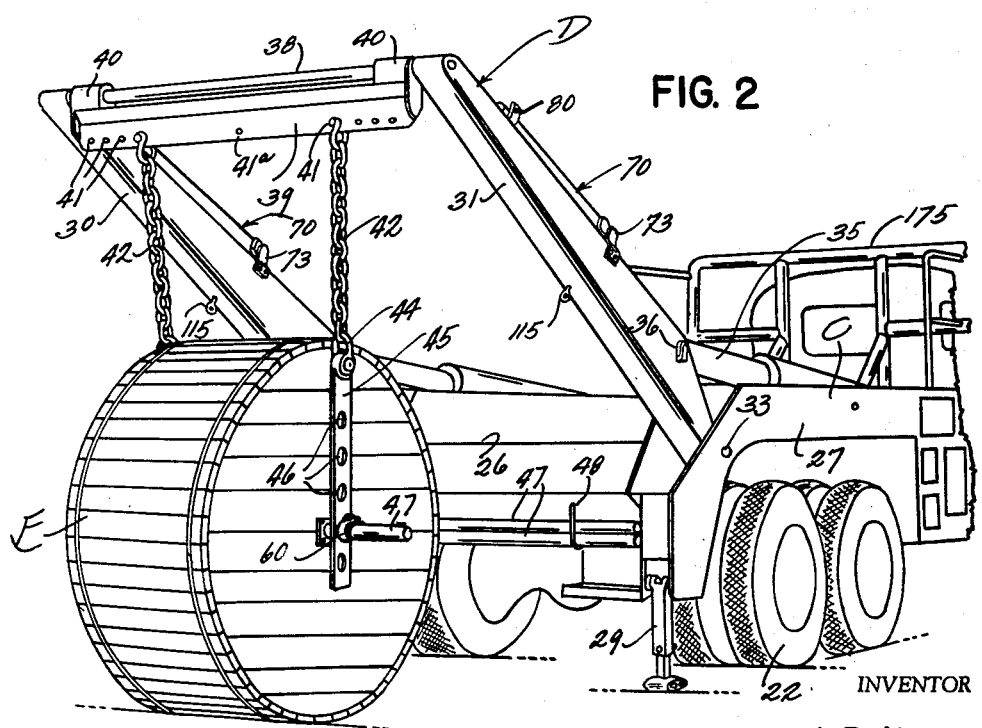
Figure 2 is a fragmentary perspective view of a truck or vehicle showing the hoisting equipment of the present invention connected to a cable reel ready for lifting the same upon the deck of the truck.
Figure 3:
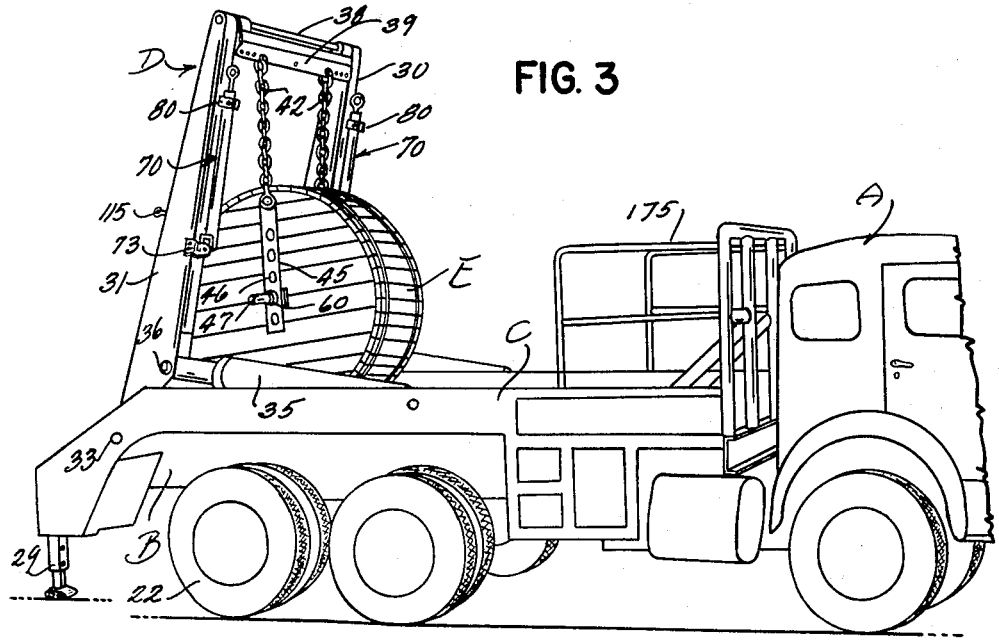
Figure 3 is a fragmentary perspective view of the truck and its hoisting equipment, showing the hoisting parts after they have raised the reel to the deck of the transporting vehicle.

The hydraulic operating, hoisting, lowering and handling equipment D includes two powerful lift arms or booms 30 and 31 attached by means of a load shaft 33 upon the sub frame 24. The boom arms are each actuated by means of double acting hydraulic piston and cylinder devices 35 which are pivoted at 36 thereto, spaced above the boom arm pivots 33, for swinging fore and aft to effect lifting and lowering of loads. The hydraulic operating means is conventional and may conform to the operating means shown in U. S. Patent 2,313,514. The valve controls (not shown) are located in the cab and a conventional valve lever control may be placed at one side of the truck body just rearwardly of the cab if desired. The lowered position of the boom arms is shown in Figures 2, 8 and 16, and they may be elevated for the placing of loads upon the deck 26, as shown in Figure 3.

At the outer ends of the lift or boom arms 30 and 31 is located a cross shaft 38. A bar sling 39 is swivelly suspended from this cross shaft, having bearing extensions 40 secured at the ends thereof for such purpose. The bar sling 39 is provided with series of openings 41 at each end, spaced below the cross bar 38, for selectively receiving the upper supporting links of lift chains 42 in order to properly space said chains to conform with the varying widths of loads to be lifted or lowered. A central opening 41ª may also be provided, if desired.

Since the equipment is primarily intended to handle huge reels or drums of cables coiled thereon, the lift chains 42 at their lower ends are provided with special links 44 supporting bars 45 which may be referred to as key plates. The key plates 45 are provided with series of spaced vertically elongated openings 46 therealong adapted to receive the ends of a spindle or shaft 47 of the reel E. The spindles 47 are removable from the reels. A series of them may be supported at the rear of the sub frame upon suitable brackets 48 where they will be readily accessible.

The reels E each may include a hub portion 50, shown in Figure 12, to which side flanges 51 are suitably rigidly connected; the latter having reinforcing bearing rings 52 of any approved type for receiving the spindles 47. The spindles 47 are sufficiently long so their ends will extend outwardly beyond the sides of the reel, for appreciable distances. Preferably these spindles at their outer ends have transverse passageways 53 therethrough for receiving safety pins 54.

It is thought best to describe the remaining details of the hydraulically operated hoisting, lowering and handling equipment D by referring to a sequence of operations for loading two of the reels E upon the deck of the truck or vehicle.

In Figure 1 the truck is shown backed up to a reel E. The boom arms are moved rearwardly to lower the key plates at the sides of the reel. The spindle 47 is then inserted through the reel and the key plates lifted to slip the ends of the spindle, at each side of the reel, into the desired opening. These openings may be marked with suitable diameter numbers because the equipment will be used for lifting and lowering and otherwise handling reels of varying diameters. Next, friction clamps 60 are secured in position upon the protruding ends of the spindles, in about the positions shown in Figure 12. These friction clamps 60 are split sleeves with bolts 62 for securing them upon the spindles. Next, the safety pins 54 are slipped through the openings 53. These safety pins 54 are of the type having a collapsible retainer 64, shown in Figure 12. Before the lift arms pick up the reel, the jacks 29 are lowered, as a means of protection to the springs and axle of the truck. The control of jacks 29 takes place at the control panel in the cab, as is well understood in the art to which this invention relates. The valve control mechanism is then actuated by the operator to move the boom arms 30 and 31 upwardly and the reel E is thus lifted onto the deck 26 substantially to the position shown in Figure 3. In this location the boom arms will slightly incline forwardly to a point where the reel is eased upon the deck. Temporary chocks (not shown) are then placed fore and aft to immobilize the reel. Thereafter, the key plates 45 are disconnected from the spindle 47.

Figure 6:
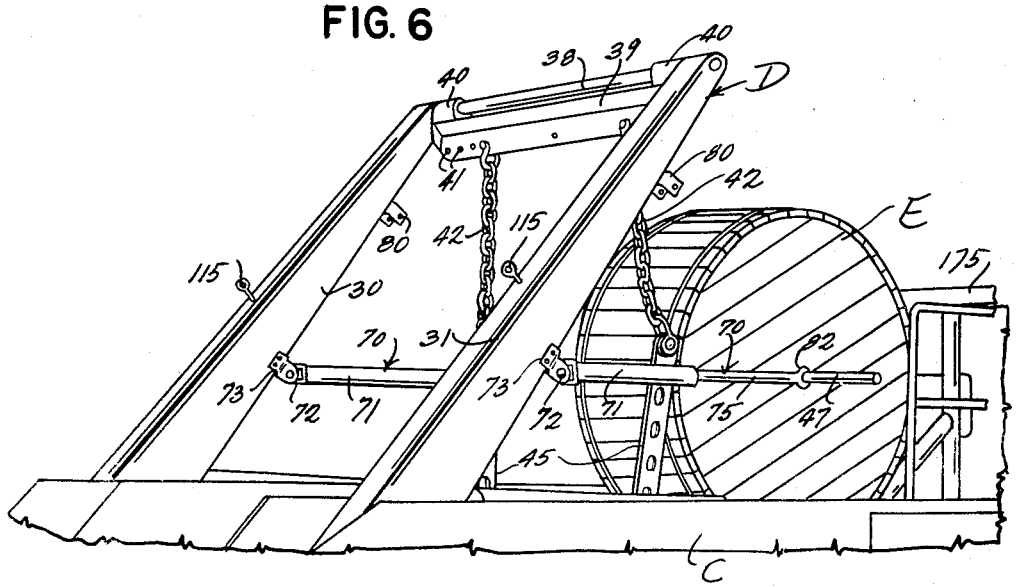
Figure 6 is a fragmentary perspective view of the truck and the hydraulically actuated hoisting and handling arms in position after the reel has been moved to its most forward position upon the deck of the vehicle.
Figure 4:
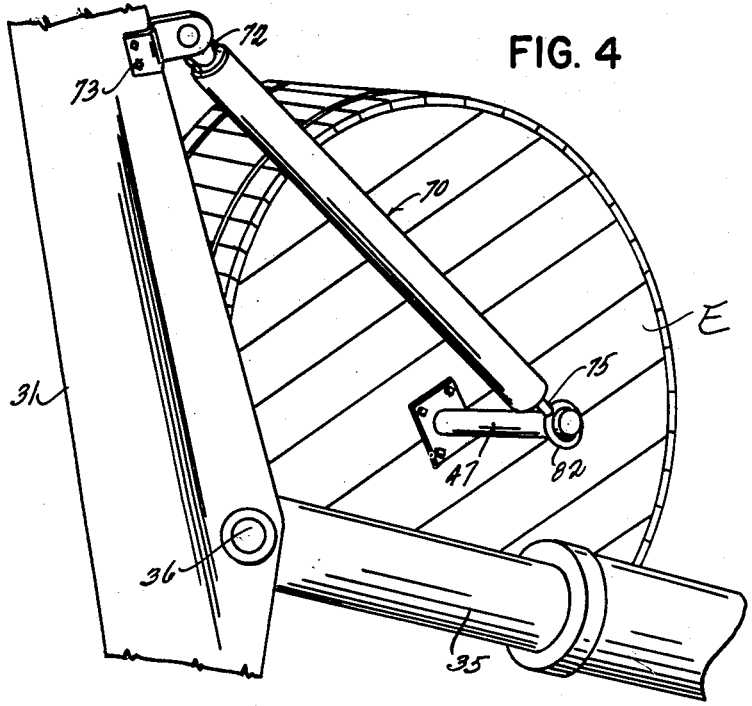
Figure 4 is a fragmentary perspective view showing the attachment of reel positioner arms upon the reel after the latter has reached the deck of the transporting vehicle or truck, for the purpose of moving the reel more forwardly upon the truck deck.
Figure 5:
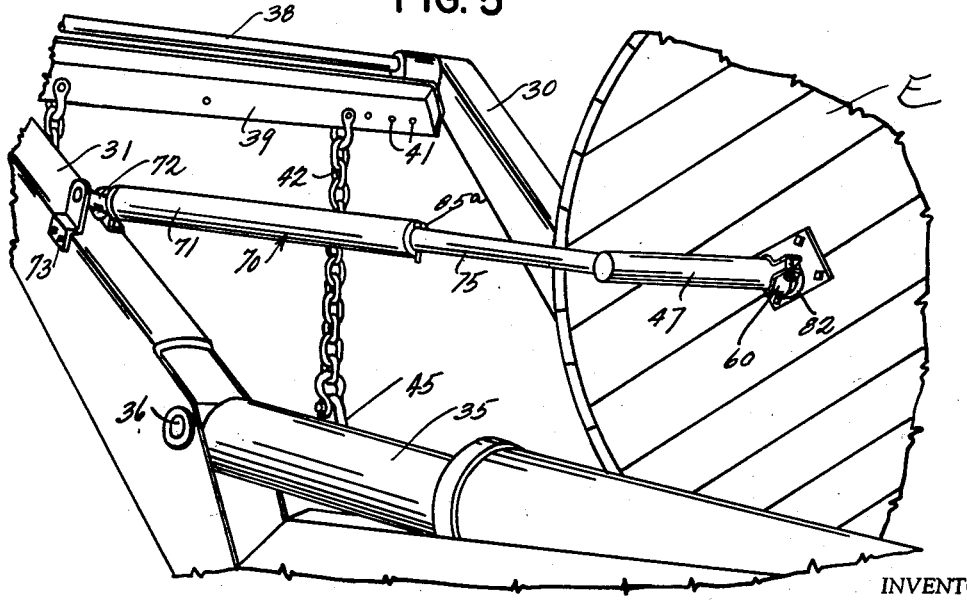
Figure 5 is a fragmentary perspective view showing the reel positioner arms extended just prior to actuation of the hydraulic arms of the truck, for pushing the reel to its most forward position upon the deck of the truck.
Figure 11:
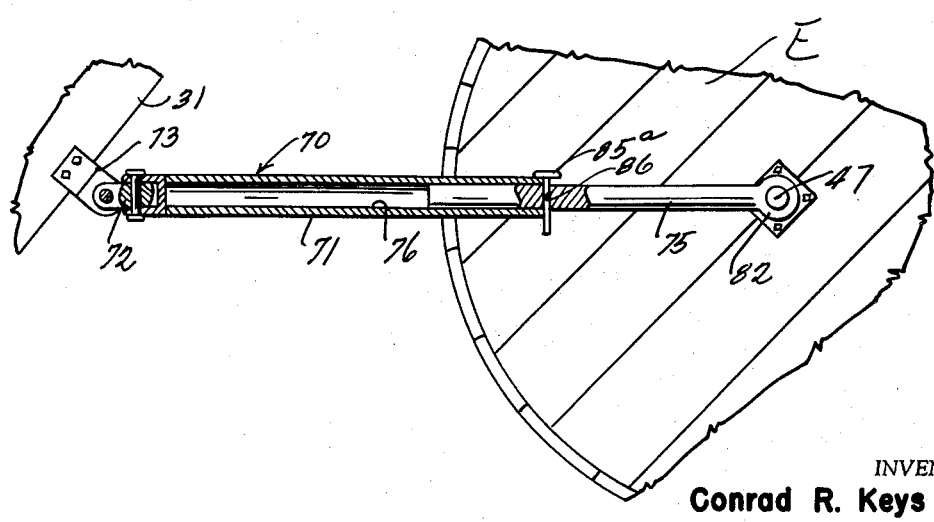
Figure 11 is a fragmentary view, partly in cross section, showing detailed structure of an extensible reel positioner arm.

For further movement of the reel E from the position of Figure 3, to the front part of the deck, I provide load positioners 70. They may be called reel positioners since their primary purpose is that of moving cable reels, fore and aft on the deck of the truck between the positions shown in Figures 3 and 6. They are located on the forward sides of each of the boom arms 30 and 31. Each of the same includes a rear elongated tubular portion 71 connected by means of a universal joint 72 at its rear end to a bracket 73 which is secured upon the boom arm. Each positioner 70 furthermore includes an outer bar portion 75 telescopically disposed in the passageway 76 of the tubular portion 71 for extension therefrom. Normally the reel positioner portions 71 and 75 are telescoped and folded parallel with the respective boom arms; the other ends thereof remote from the bracket 73 are held in a suitable securing bracket 80 which may have a removable bolt therein in order to hold the positioners collapsed forwardly upon the boom arms. The positioners 70 may be disconnected from their brackets 80 and lowered. The outer end of each bar portion 75 has an eye 82. The eyes 82 are slipped over the ends of the reel spindle 47 as shown in Figure 4. The lift arms are then moved rearwardly by the hydraulic control mechanism in order to extend the reel positioners to their maximum lengths. Lock pins 85ª are then inserted into passages 86 provided in the rod portions 75 of the positioners as shown in Figure 11. Under the control of the operator the hydraulic mechanism then moves the boom or lift arms forwardly, and this will roll the reel forwardly to the position shown in Figure 6. The reel positioners 70 are then disconnected from the reel spindle 47. The reel E is then secured in position by wrapping a securing cable 85 around the protruding ends of the spindle at each side of the reel. The securing cables 85 are wound upon and actuated by means of ratchet type hand winches 87, shown in Figure 9 of the drawings. A power winch may be provided for securing the reel to the sub frame, in which case the securing cable will engage over the peripheries of the reels and be attached to the rear end of the sub frame. Hard wood bolsters 90 are secured upon the deck of the truck fore and aft of the reel. One of these bolsters 90 is shown in Figure 9 of the drawings resting upon the deck 26. They are engaged by the periphery of the reel. On their undersides they have holding pin sockets 83, as shown in Figure 10. Suitable tubular sockets 91 are supported by the deck 26, substantially as shown in Figures 10 on the drawings, having their passageways 92 opened upwardly upon the deck for receiving bolster blocking pins 93. These blocking pins 93 are preferably removable from their sockets. A plurality of rows of the sockets 91 are provided lengthwise along the deck 26 in order to suit the rest positions of the reels and the diameters of the reels. The sockets 91 may have closed lower ends to support the pins 93, or provided with suitable spiders to hold the pins and permit debris to drop through the socket.

With the first reel E firmly secured forwardly upon the deck, by the bolsters 90, and the cables 85, the second reel E is approached and lifted upon the deck of the vehicle in the same manner as above described for the first reel E. The boom arms will lift the second reel accurately in position without the necessity of using the reel positioners 70. The second reel E is then secured fore and aft by means of bolsters 90 in the manner above described for the first reel. The securing cables 85 are extended and wrapped around the end of the spindle of the second reel and drawn tight in secured position upon the spindle ends of both of the reels E now on the deck of the vehicle, as shown in Figure 7. With both reels secured by the bolsters 90 and cables 85, the lift arms 30 and 31 are moved forwardly to the position shown in Figure 7 for road clearance. The free swinging jack legs 29 are then elevated, as shown in Figure 7. The truck is now ready to transport the reels to the desired location. The unloading operation is the reverse of that above described for loading. In Figure 8 is shown the ease with which reels can be lifted when they are stacked one upon the other at a storage space. The most rearwardly position boom arms are shown with the key plates secured to the spindles of the top reel E'. The control mechanism then lifts the reel E' to the intermediate dot and dash line position and then the reel is eased onto the deck of the vehicle at the foremost position shown in dot and dash lines in Figure 8.

The adaptability of the apparatus for loading or unloading reels with respect to box cars and elevated platforms is shown in Figure 13. In this view, 100 designates the box car floor and 102 the box car roof. The latter interferes with sufficient lowering of the boom arms to efficiently lift the reel. I provide a bridge piece 103 shown in Figure 13, and in greater detail in Figure 14. It has side angles 105 supporting a floor plate 104. Each side angle 105 is adapted to rest upon box car floor 100 as shown in Figure 13, and it is under notched at 107 to receive the car door guides. Bottom cross reinforcing 108 is provided for the bridge plate. The opposite end 110 projects beyond the floor plate for resting upon the load shaft 33 of the sub frame. It is under notched at 116 for this purpose.

The bridge plate 103 is shown in position in Figure 13 between the floor 100 and the truck deck. A reel E''' already has been unloaded and placed forwardly on the deck of the vehicle. Each boom arm 30 and 31 is provided with a suitable eye bolt or extension 115, intermediate the ends thereof, upon their rear surfaces, adapted for releasable connection with push-pull rods 116. Each push-pull rod 116 is provided at its forward end with a suitable connection for the extension 115, thus pivoting the same upon the boom arm. The rod 116 at its opposite end is provided with an eye 117 for slipping over the end of the spindle 47 of the reel to be unloaded from the platform 100. The operation consists of properly attaching the push-pull rods 116 upon the boom arms. The arms are then moved rearwardly to their lowest possible position in view of car roof obstruction. The rods 116 are fixed upon the ends of spindle of the reel E''. The operator through control mechanism then moves the booms from the full line position shown in Figure 13 to the dotted line position indicated at 120. This pulls the reel E'' onto the deck 103. The push-pull rods 116 are disconnected from the spindle ends and the boom arms are moved to the position indicated at 122 in Figure 13. The key plates 45 are then attached to the ends of the spindle 117 on the reel resting upon the bridge 103. The boom arms are then moved by the hydraulic controls to about the position 120 and at which time the reel makes contact with the truck deck at the position 135. For the first reel E''' to be placed upon the truck shown, at this point the key plates were disconnected from the spindle ends, and the reel positioners 70 attached to the spindle ends. The telescopically extensible reel positioners were then manipulated (as above described) and the reel E''' moved to its foremost position upon the deck. The reel E'' is removed from the platform 100 onto the deck of the truck in the manner as above described, except that during this operation the reel positioners 70 are not used. Bolsters and hand winch operated cables are manipulated to secure the reels upon the truck, in the manner above described.

The apparatus for lifting and transporting heavy and bulky objects such as electric power sub stations is shown in Figures 16 to 19 inclusive. For such purposes the boom arms 30 and 31 are each provided with individual stub shafts 130 (see Figure 18), secured at 131 upon the upper ends thereof. A cross bar 38 is not used, since the object F to be lifted, an electric power sub station, has height which requires that it fit between the outer ends of the boom arms as shown in full lines in Figure 16 of the drawings.

I provide a pallet 135 for cradling the load F. This pallet 135 is preferably a very strongly built and reinforced structure including a platform 136 supported by I beams 137, preferably border channels 138 are provided to which the beams 137 are welded. Channel standards 139 may be welded to the platform channels 138, and the side standards 139 at their upper ends may be connected at each side by a strong cross rail 140, as shown in Figure 16. At their upper ends the standards 139 have suitable chain attaching knobs 145.

The gear for connecting the pallet to the boom arms may consist of chain attaching saddle pieces 146, each of which includes a block portion 147 oscillatively mounted upon a stub shaft 130 and held by a flange against endwise movement thereon in an inner direction. Each chain saddle furthermore includes a U-shaped bolt 148 secured to the block 147, as shown in Figure 17, to which lift chains 150 and 151 are attached. The lift chains at their lower ends may include the conventional eyes for detachable connection with knobs 145.

In operation, the pallet 135 is positioned upon the ground and the unit F placed thereon by any suitable means. The truck unit then backs to this location and after the boom arms 30 and 31 have been lowered and the chains 150 and 151 attached to the pallet 135 the jack legs 29 are lowered to engage the ground. The operator then manipulates the controls for hydraulically swinging the boom arms upwardly and forwardly for depositing the sub station F and its pallet 135 upon the deck of the vehicle. It may now be transported to the desired location and lowered by operating the boom arms.

Figure 15:
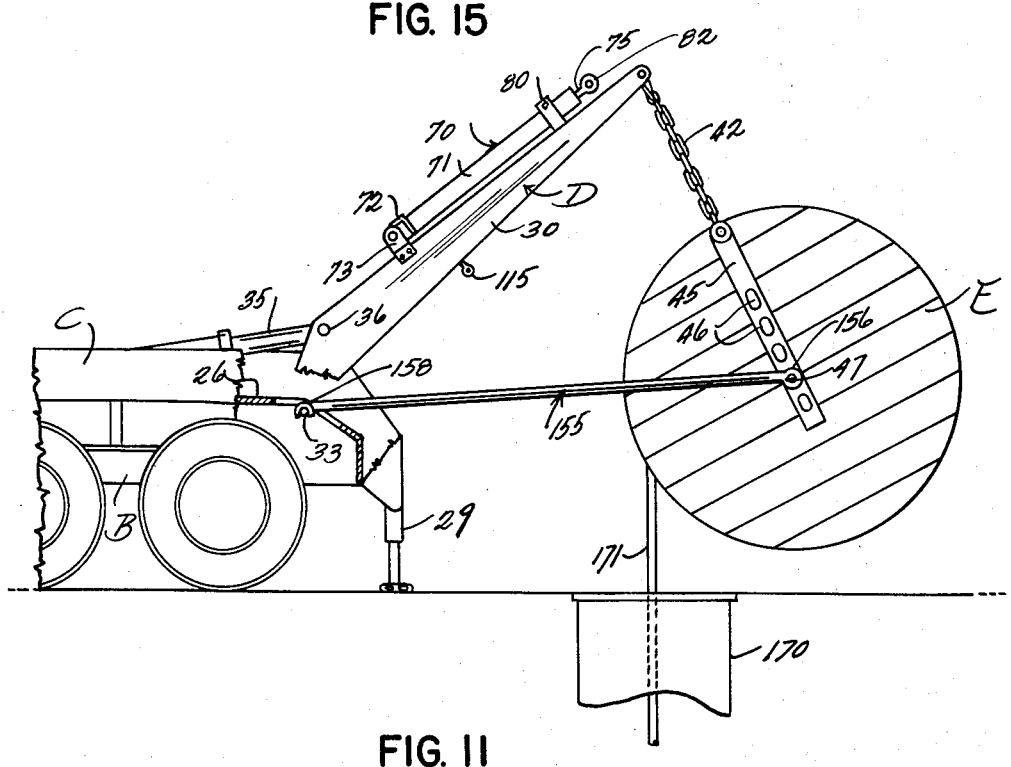
Figure 15 is a fragmentary view of the truck and hoist, showing a cable reel suspended in a safe and stabilized position for uncoiling and removal of the cable from the reel, at a man-hole or other fixed location.

In Figure 15 is shown a means by which a reel E may be suspended in safe and stabilized position, at a precise location for paying out the cable while the reel is rotated in a suspended position. The boom arms and the key plates above described are used for this operation including stabilizing and positioning rods 155. Each rod 155 has an eye 156 at one end for attachment to the extending end of the reel spindle 47 and at its opposite ends each rod 155 is provided with a hook or other means 158 for connection upon the load shaft 33 provided upon the sub frame. The deck 26 is cut away at each rear corner (see Figure 15). The jack legs 29 are lowered for ground contact after the truck and apparatus have been manipulated so the periphery of the reel E lies tangential to the passageway of the man-hole 170 into which the cable 171 is to be fed. The real E will rotate freely upon its spindle 47 in a well stabilized and suspended position, shown in Figure 15. The reel will not sway sidewise nor fore and aft during such unreeling.

The truck has a front reinforced protecting barrier 175. The key plates may be secured by means 176 to the sides of the sub frame to hold them against sway while not in operation.

Various changes may be made to the size, shape and arrangement of parts of this invention without departing from the spirit of the invention or scope of the claims.

I claim:

1. In apparatus for lifting, loading, transporting and lowering heavy bulky articles, the combination of a truck having running gear and a deck, a hoist unit upon the truck including a boom arm at each side of the deck, a flexible load attaching device connected to the outer ends of the arms for lifting and lowering loads with fore and aft movements of said boom arms, means connected intermediate the ends of said arms for rear connection with a load whereby to facilitate desired movements of the load upon appropriate movements of said arms, and means connected intermediate the ends of said arms for forward connection with a load whereby to facilitate desired movements of the load upon appropriate movements of said arm.

2. Apparatus as described in claim 1 wherein the last mentioned means are rigidly extensible in a forward direction and have universal jointed connection with said boom arms.

3. Apparatus as described in claim 1 wherein the first mentioned means is pivotally connected rearwardly upon each of said arms and wherein the second mentioned means is pivotally connected forward upon each of said arms.

4. Apparatus for lifting, loading, transporting and lowering heavy bulky articles, comprising a truck having running gear and a deck, a hoist unit mounted at each side of the deck rearwardly upon the truck, each hoist unit including a boom arm, means suspended from the outer ends of said boom arms for attachment to a load for supporting the load in suspended position and moving the same through lifting and lowering movements of said arms, and means connected intermediate the ends of each of said arms comprising a forwardly extending rigid push and pull structure for fore and aft movements of a load upon the deck of a vehicle.

5. Apparatus for lifting, loading, transporting and lowering heavy bulky articles, comprising a truck having running gear and a deck, a hoist unit located on the truck at each side thereon, each unit including a boom arm pivoted at its lower end upon the truck at the rear of the truck deck, hydraulic means for fore and aft movements of said boom arms, a flexible load attaching device connected to the outer ends of said arms for lifting and lowering loads with respect to the deck, and rigid push and pull rods connected intermediate the ends of each of said boom arms and extending rearwardly therefrom for load manipulation upon the truck deck.

6. In combination with a truck having hydraulically actuated boom arms pivotally mounted at the rear thereof for fore and aft movements, a cross bar connected to the outer ends of said boom arms, a bar sling oscillatively mounted upon the cross bar, and cable attaching suspension devices having means for selectively connecting the same at desired distances along the bar sling so as to locate them in appropriate spaced relation to fit the desired width of a reel.

7. Apparatus as described in claim 6 in which the suspension devices each consist of a flexible chain for connection with the bar sling and an elongated rigid bar plate connected to the lower end of each chain having a series of openings therealong spaced at different distances whereby to receive the spindles of reels of varying diameters.

8. Apparatus of the class described comprising a truck having a deck and running gear, boom arms pivoted at their lower ends upon the rear of the truck, hydraulic means for actuating said boom arms for fore and aft movements with respect to said deck, a pair of flexible lifting and suspending members having means for connecting the same axially at each side of a reel, and stabilizing rods having means for detachable connection with the rear end of the truck in rearwardly extending positions and at their rear ends having means for axially connecting the same to a reel for permitting rotation of the latter in supported position above a ground surface.

9. In apparatus for the loading and unloading of heavy bulky objects such as reels from elevated platforms, such as the floor of a box car, the combination of a truck body having a deck and running gear supporting the same, boom arms pivoted upon the rear of the truck having hydraulic means for fore and aft movements of the arms with respect to the deck, a bridge piece for bridging between the deck and a floor or elevated platform, suspension means connected with the outer ends of the boom arms having means for axial connection with a reel for the lifting of the same upon appropriate movements of the boom arms, push and pull rods connected intermediate the ends of the boom arms and extending rearwardly thereof and having means at their rear ends for axial connection with a reel to push and pull the same from the elevated platform or box car onto and across the bridge piece.

10. Apparatus as described in claim 9 in which extensible rigid rod means is provided upon the intermediate portions of each of the boom arms for forward extension for moving reels forwardly along the deck of the truck after the same has been deposited thereon by the suspension means.

11. Apparatus for lifting, loading, transporting and lowering heavy objects such as electric power sub stations and the like, comprising a truck having running gear, boom arms pivotally mounted rearwardly upon the truck having hydraulic means for moving the same fore and aft with respect to the truck, a pallet for supporting the heavy object, means on the arms for releasable connection with said pallet at each side of the pallet, said means being free of cross connection between the outer ends of the boom arms whereby the load to be supported may lie directly between the outer ends of the boom arms.

12. Apparatus as described in claim 11 in which the means for connecting the pallet to the boom arms comprises independent stub shafts connected to the outer ends of the boom arms and in relatively spaced relation, saddles oscillatively mounted upon said stub shafts, and pallet attaching chains connected to said saddles and depending therefrom for pallet attachment.

13. An apparatus for lifting, loading, transporting and lowering heavy cable reels comprising a truck having running gear and a deck, hydraulically actuated boom means pivotally mounted upon the truck rearwardly thereof for fore and aft lifting and lowering movements with respect to the deck, a cable reel, means for connecting the cable reel to the boom means whereby the reel may be lifted and deposited upon the deck of the truck or lifted therefrom and lowered, and additional means connected upon the boom means for connection to the cable reel for rolling it forwardly upon the deck after the boom means has initially deposited the same upon the deck.

14. Apparatus for lifting, loading and transporting and lowering heavy cable reels comprising a truck having a supporting deck and running gear, boom arms pivotally connected upon the rear of the truck for fore and aft movements, flexible reel depending members connected to the outer ends of the said boom arms, elongated rigid plates connected to the free ends of said flexible reel depending members, each of said plates being provided with a series of transverse openings along the length thereof for receiving therein the spindles of reels of different sizes which are adapted to be lifted and lowered by the boom arms.

15. Apparatus for lifting, loading, transporting and lowering heavy bulky articles such as cable reels, electric power sub-stations and the like comprising a truck having a supporting deck and running gear, hydraulically actuated boom arms pivotally connected at their lower ends upon the rear end of the truck, cable take-up winches located forwardly upon the front portion of the deck having reel securing cables wound thereon, means upon said boom arms for supporting and lifting and lowering said cable reels with respect to said deck, and elongated rigid rods pivoted upon said boom arms for pushing and pulling reels fore and aft with respect to said deck.

16. In apparatus for handling heavy cable reels, the combination of a truck including a supporting deck and running gear, boom arms pivoted upon the rear of said truck and swingable forwardly over the deck and to the rear beyond the rear end of the said truck, hydraulic means for moving the boom arms fore and aft, flexible reel supporting means connected to said boom arms, means for connecting said last mentioned means axially to a reel at each side of the reel whereby the reel may be lifted, loaded upon the deck and suspended and lowered upon a ground surface, and elongated rigid stabilizing and positioning rod for connection rearwardly with the truck and forwardly to a reel at the axis of the latter to hold the reel in stabilized position above a ground surface and rearwardly of the truck when the reel is suspended by said boom arms.

17. Apparatus for the lifting, loading, transporting and lowering of heavy cylindrical objects such as cable reels comprising a truck having a supporting deck and running gear, boom arms pivoted at their lower ends upon the rear of the truck, means for actuating said boom arms for fore and aft swinging movement to positions entirely rearwardly of the truck and over and forwardly with respect to the deck, an axle for connection with the cylindrical object to be lifted, suspending means connected with the outer ends of said boom arms for connection to said axle at each side of the object whereby to manipulate the cylindrical object with respect to lifting, lowering, and movements over the deck of the truck, and stabilizing rods pivotally mounted upon said boom arms and extending rearwardly thereof for attachment to the axle ends of the cylindrical object at each side of the latter whereby to shift the object fore and aft over said deck.

18. Apparatus as described in claim 17 wherein the said stabilizing rods are longitudinally adjustable and in which they are universally pivoted to said boom arms intermediate the ends of the said arms between the pivots and the suspending means.

References Cited in the file of this patent
UNITED STATES PATENTS

| | | |
|---|---|---|
| 1,699,587 | Grenier | Jan. 22, 1929 |
| 1,864,676 | Smith et al. | June 28, 1932 |
| 2,099,998 | Berg | Nov. 23, 1937 |
| 2,179,825 | Lewis | Nov. 14, 1939 |
| 2,190,258 | Colorigh | Feb. 13, 1940 |
| 2,334,336 | Lathrop | Nov. 16, 1943 |
| 2,543,381 | Rosenzweig | Feb. 27, 1951 |
| 2,550,185 | Busch | Apr. 24, 1951 |
| 2,551,174 | Shipman et al. | May 1, 1951 |
| 2,601,960 | Hick | July 1, 1952 |
| 2,623,759 | Forbas | Dec. 30, 1952 |
| 2,771,197 | Leffler | Nov. 20, 1956 |